Sept. 26, 1961 H. A. MARTENS 3,001,421
COIL MOUNTING FOR ELECTRONIC TOOL DETECTOR
Filed April 15, 1959
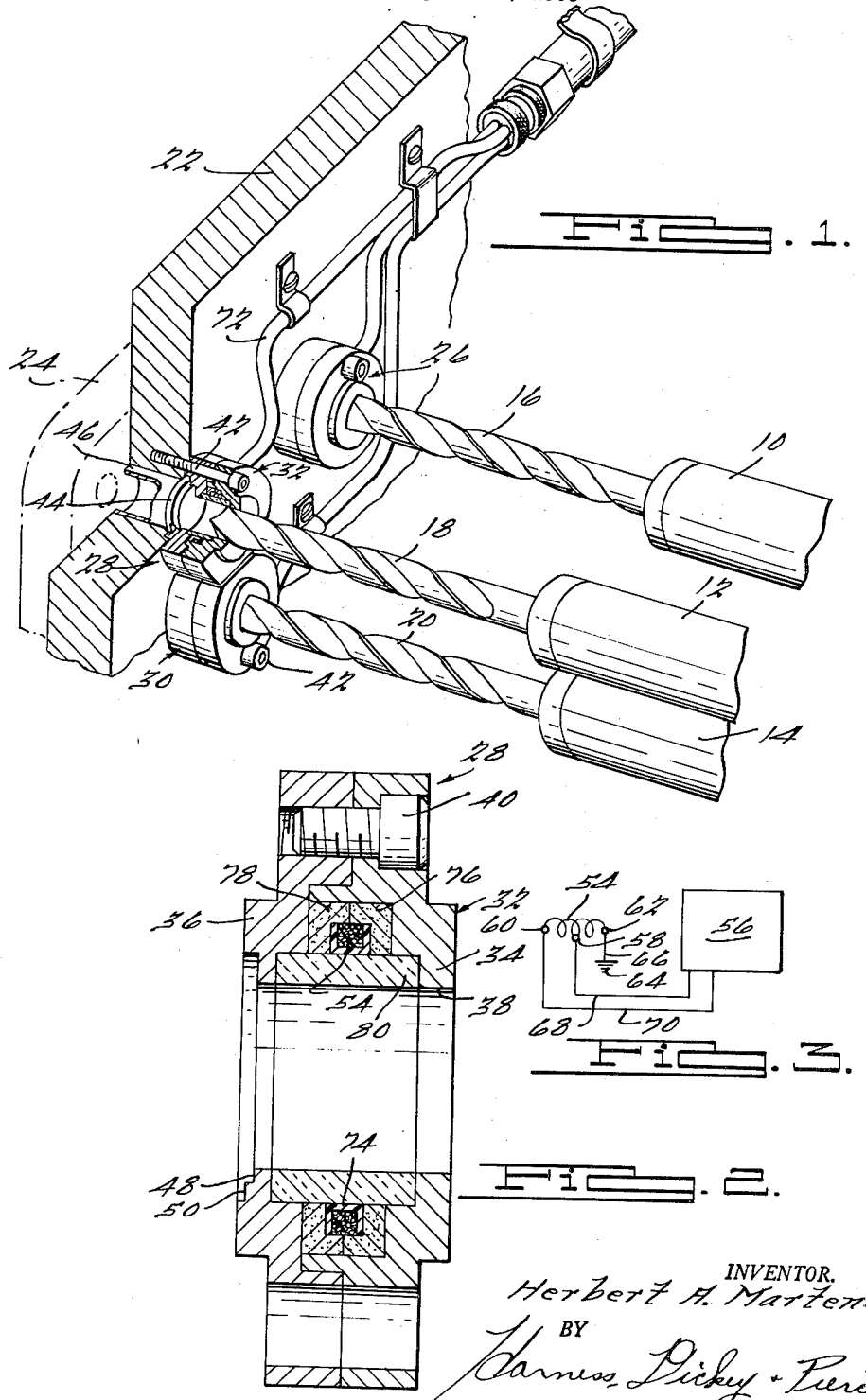
INVENTOR.
Herbert A. Martens.
BY
Harness, Dickey & Pierce
ATTORNEYS.

United States Patent Office 3,001,421
Patented Sept. 26, 1961

3,001,421
COIL MOUNTING FOR ELECTRONIC TOOL DETECTOR
Herbert A. Martens, Birmingham, Mich., assignor to The Cross Company, Fraser, Mich., a corporation of Michigan
Filed Apr. 15, 1959, Ser. No. 806,466
20 Claims. (Cl. 77—22)

This invention relates broadly to electrical sensing apparatus and more particularly to an apparatus of this type that is adapted to detect broken or improperly set tools in a machine tool.

Apparatus of the above type conventionally includes one or more sensing coils, and this invention is concerned particularly with a novel mounting for the sensing coils which overcomes or materially reduces certain technical difficulties inherent in the adaption of such apparatus to the machine tool field.

A typical electrical sensing apparatus of the type with which this invention is concerned is illustrated and described in the application for Letters Patent of David L. Elam, Serial No. 481,146, filed January 11, 1955 and issued April 21, 1959 as Patent No. 2,883,538. FIGURE 3 of the application illustrates the complete circuitry of the apparatus disclosed in the application, and the sensing coil with which the instant invention is particularly concerned is designated by the numeral 31 in FIG. 3 of the Elam patent. A similar apparatus particularly adapted for use in the machine tool field is shown in the application of Ralph E. Cross and Herbert A. Martens, Serial No. 781,089, filed December 17, 1958. FIGS. 6, 12 and 15 of the latter application illustrate typical circuitry for the invention therein disclosed, and the sensing coil with which the instant invention is particularly concerned is designated by the numeral 28 in FIGS. 6 and 12 and by the numerals 28 and 30 in FIG. 15. A complete description of the inventions disclosed by the above patented applications is not necessary to a complete understanding of the instant invention; however, the disclosures of these applications are incorporated herein by reference to the extent necessary to provide a background or setting for the subject matter of this invention.

Inasmuch as the instant invention is concerned merely with the mounting for the sensing coil it is in no wise limited to the particular forms of the oscillatory circuits disclosed by the above identified applications. Any form of oscillatory circuit can be used in which the oscillatory condition of the circuit is changed by the presence of a metallic object in the sensing coil. For example, the current can be changed from an oscillatory to a nonoscillatory condition, or vice versa, or some characteristic of the circuit such as the frequency or amplitude of the oscillations can be changed to a significant and measurable degree.

Briefly, the particular sensing apparatus disclosed by the above identified applications comprises an oscillatory circuit having an oscillator and a sensing coil. The oscillator is electrically connected to an output amplifier circuit which controls a signaling circuit. The oscillator oscillates continuously so long as there is no conductive object in the field of the sensing coil and the oscillations cut off the output amplifier circuit so as to render the signaling circuit inoperative. However, the presence of a conductive object within the field of the sensing coil quenches the oscillator and energizes the output amplifier circuit to operate a signal in the signaling circuit.

In adapting the above apparatus to a machine tool of the type having reciprocable tool heads carrying cutting tools, sensing coils are provided one for each cutting tool or selected group of cutting tools and the coils are disposed so that a tool passes through each coil as the heads move to advance the tools into the work. In one form of the invention, the coils are set with respect to the linear movement of the tools so that the latter just fail to clear the magnetic fields of the coils when the heads are fully retracted. Thus, if the tools are properly set and are unbroken they remain in the magnetic field of the coils at all times rendering the oscillator inoperative. However, if any tool breaks or is set too short it moves completely out of its respective coil when its head is fully retracted, thus permitting the oscillator to oscillate, cutting off the output amplifier circuit and energizing the signaling circuit.

Any suitable form of signal can be used to apprise the operator that there is a faulty tool in the machine. For example, a light can be mounted at a convenient place on the machine or its adjuncts such as the tool setup board or the main machine control panel. If the light is placed on a tool set up board of the type disclosed in the Cross et al. Patent No. 2,679,038 for example, it informs the operator not only that a tool requires changing but also identifies the particular tool or at least the particular tool head that is the source of trouble.

The most convenient place to mount the sensing coils is on the bushing plate or a suitable support carried by the bushing plate. However, this arrangement requires the presence of a relatively large number of cables and since the cables go to different parts of the machine they vary considerably in length. Variations in the capacitance of the cables, in the amount of iron near the coils, in the temperature at different parts of the machine, and other factors, affect the tripping points of the coils, viz., the points at which the tools move sufficiently into the fields of the coils to change the operating condition of the oscillator and signal the operator. Also, the above arrangement places the coils, which usually are enclosed in Micarta casings, very close to the cutting action. As a consequence, the coils are susceptible to damage and wear from chips coming off the cuts and particularly from chips carried by the tools through the guide bushing and into the coils.

An important object of the present invention is to provide a tool sensing apparatus in which the sensing coils are mounted in such a way as to negative or greatly reduce the effects of variable factors of the type hereinabove referred to and that will protect the coils from cuttings and chips carried away from the work by the cutting tools.

Another object of the invention is to provide a novel mounting for sensing coils of the above mentioned character wherein the coils are uniquely mounted so as to concentrate and shape the magnetic fluxes or fields of the coils whereby to reduce the number of factors causing variation in the tripping points of the coils.

Other objects and advantages of the invention will be apparent during the course of the following description.

In the drawing, forming a part of this specification, and wherein like numerals are employed to designate like parts throughout the same, FIGURE 1 is a fragmentary perspective view showing a plurality of sensing coils mounted on the bushing plate of a machine tool and associated with a corresponding number of drills carried by a tool head of the machine;

FIG. 2 is a diametrical sectional view through one of the sensing coils and its mounting taken on the line 2—2 of FIGURE 1; and FIG. 3 is a diagrammatic view showing a sensing coil in the oscillatory circuit of a sensing apparatus embodying the invention.

For a detailed description of the invention attention is first directed to FIGURE 1 of the drawing which shows typical coil mountings embodying the invention on a machine tool. The numerals 10, 12 and 14 designate spindles of the machine tool. These spindles 10, 12 and 14 are carried by a tool head (not shown) of a conventional type and, in turn, carry drills 16, 18 and 20, respectively. It is assumed for the purpose of this description that the tool head is slidably mounted to advance the tools 16, 18 and 20 through a bushing plate 22 and into a workpiece 24 which may be located and clamped by conventional means at the far side of the bushing plate. After each traverse of the tool head, it is retracted according to conventional practice to withdraw the drills 16, 18 and 20 from the work 24. The above apparatus and its mode of operation is conventional and forms no part of the present invention but merely provides a setting for the invention.

According to the present invention the drills 16, 18 and 20 are provided with sensing coil assemblies 26, 28 and 30, respectively. The assemblies are here shown mounted on the bushing plate 22 so that the drills 16, 18 and 20 must pass through the coils as they are advanced to and retracted from the work. It is contemplated that the coil mountings be disposed at any convenient location on the machine; however, in most instances the bushing plate is the most convenient place to mount the coils.

The coil mounting assemblies 26, 28 and 30 are identical in construction and a detailed description of one only therefore is given. The coil assembly 28 is shown partly in section and partly in elevation in FIGURE 1 and an enlarged diametrical sectional view thereof is shown in FIG. 2 and this assembly therefore has been selected for detailed consideration.

The mounting 28 comprises a generally disk-shaped housing 32 which preferably is formed in two sections 34 and 36 and has a central opening 38 through which the drill 18 passes. One or more screws 40 holds the housing sections 34 and 36 normally together. As perhaps best shown in FIGURE 1, the housing 32 is fastened with one side against the bushing plate 22 by screws 42 and over the head 44 of a bushing 46 which extends into a recess 48 in the under side of the housing. A key 50 interconnecting the housing 32 and the bushing 46 prevents the latter from turning in the bushing plate 22. The bushing 46 of course has the usual bore 52 which registers with the central opening 38 of the housing 32 and through which the drill 18 also passes during operation of the tool head.

The housing 32 mounts a detector or sensing coil 54 of an oscillatory circuit 56 (FIG. 3) which may be of any conventional type such as the ones shown in the Elam or the Cross et al. applications hereinabove referred to. The coil 54 here shown has a center tap 58 and end taps 60 and 62. The end tap 62 is connected to ground 64 by a conductor 66 and the taps 58 and 60 are connected by conductors 68 and 70 to the oscillator 56. The conductors 66, 68 and 70 are wrapped together to form a cable 72, as shown in FIG. 1.

The coil 54 preferably is wound around an annular spool or bobbin 74 of any suitable magnetically inert material such as nylon or Micarta. The coil 54 on the bobbin 74 is mounted in an annular recess 76 in the central opening 38 of the housing 32 and is separated from the metal of the housing by an annular shield 78 of a material having high magnetic permeability and which is a nonconductor of electricity. A material has "high" magnetic permeability for the purpose of this invention if it has a relative permeability greater than unity. The only materials presently known to the inventor herein that are suitable as a shield are ferrite and insulated powdered iron. Because of the shape of the housing 32 and the manner in which the coil 54 is set into the housing, the shield 78 is disposed on three sides of the coil assembly. As shown in FIG. 2, the shield 78 is generally U-shaped in transverse section so that it entirely surrounds and embraces the coil assembly. The ferrite or insulated powdered iron usually is obtained in powdered form, and it can be placed in the recess 76 around the coil assembly in powder form. The shield material is fully operative in this form; however, as a practical matter, it is difficult to assemble the various parts of the assembly and to properly place the shield using loose powdered material. Consequently, the particles of the shield material preferably are fused or bound together by sintering or other suitable means to provide a solid shield form.

In order to protect the relatively soft bobbin 74 and the shield 78 from the cutting tool 18 and particularly from chips or shavings coming off the work 24 and carried into the housing 32 by the tool as the tool head is retracted, an annular liner 80 is mounted in the opening 38 inside the bobbin and the shield. Any suitable electrically inert material having the necessary hardness and wear properties can be used for the liner 80. Ceramic is the preferred material. As shown, the ceramic liner 80 preferably extends axially beyond the sides of the shield 78. Further, experience has shown that the tool 18 and the chips carried thereby sometimes tend to chip or break the ends of the ceramic liner if the latter are exposed. Accordingly, the housing sections 34 and 36 preferably overlap the ends of the liner, as shown in FIG. 2, to protect and shield the same from the tool.

When the sensing coil 54 is connected to and made part of an electronic tool detector apparatus of the type disclosed in the above identified applications for example, it permits the oscillator circuit to oscillate so long as there is no tool in the coil and in so doing energizes a signal to apprise the machine operator that a tool associated with the coil is broken or misset. However, as the tool approaches the coil 54 it enters the magnetic field of the coil and eventually a point is reached where the energy loss to the tool is sufficient to quench the oscillator and shut off the signal. The point at which this occurs is referred to as the tripping point of the coil. In normal operation, the tool is maintained in the coil to keep the oscillator continuously quenched and it is retracted after each operation thereof to a point where it just fails to clear the tripping point of the coil. The device must operate so that if the drill is set too short or if the tip or any portion thereof is broken in use, it clears the tripping point of the coil when in the fully retracted position and energizes the signal to apprise the operator that something is wrong.

Manifestly, the accuracy of the apparatus depends on maintaining the tripping point of the coil. In practice and as hereinabove suggested, the tripping point is affected by physical conditions of the apparatus and its environment. For example, the tripping point may be changed by variations in the capacitance of the cable 72, by variations in the amount of iron near the sensing coil 54 and even by variations in the temperature adjacent to the coil. The purpose of this invention is to mount the coil in such a way and in such an environment that it is relatively unaffected by circuit and machine conditions which otherwise adversely affect the operation and accuracy of the apparatus.

The presence of the shield 78 of ferrite or insulated powder iron around the coil 54 concentrates the magnetic field of the coil and substantially fixes and maintains the tripping point. Also, it minimizes the effect on the coil of external parameters which otherwise cause variations in the tripping point and introduce errors in the operation of the apparatus. Because of the high magnetic permeability of the ferrite or insulated powdered iron shield material, the magnetic flux generated by the oscillating coil is confined to and concentrated in the shield on the outside of the coil. This prevents the flux from inducing currents in the surrounding metal whereby to load the oscillator and prevent it from oscillating. The nonconducting property of the ferrite and insulated powered iron prevents currents from being inducted in the shield itself. By permitting metal to be brought close to the outside of the detector coil, the coil can be embedded in the steel plate or other suitable metal block and made part of the bushing plate or other machine member. This not only protects the detector coil from physical damage but it permits the coil to be mounted closer to the end of the tool and allows more freedom in the application of the tool detector apparatus.

What is claimed is:

1. In an electronic tool detector, an oscillatory circuit including a sensing coil, a metal housing having an opening adapted to receive a tool in use and carrying said coil in said opening, and a magnetic shield of a material having a relative permeability greater than unity and which is electrically nonconductive interposed between said coil and said housing operative to shape and concentrate the magnetic field of the coil whereby to prevent the flux of said coil from inducing currents in the housing and affecting the normal condition of said oscillatory circuit.

2. In an electronic tool detector, a metal housing having an opening therein, an oscillatory circuit having a sensing coil in said opening adapted to receive a tool in use, and a shield interposed between said coil and said housing composed of a material selected from the group consisting of ferrite and insulated powdered iron, said shield preventing flux loss from said coil to said metal housing and consequential interference with the normal condition of said circuit.

3. In an electronic tool detector, an oscillatory circuit including a sensing coil, a housing having an opening adapted to receive a tool in use and carrying said coil in said opening, and a ferrite layer interposed between the coil and said housing forming a shield for shaping and concentrating the magnetic field of the coil and preventing hysteresis and eddy current losses from said coil to said metal housing.

4. In an electronic tool detector, an oscillatory circuit including a sensing coil, a housing having an opening adapted to receive a tool in use and carrying said coil in said opening, and a layer of insulated powdered iron interposed between the coil and said housing forming a shield for shaping and concentrating the magnetic field of the coil and preventing hysteresis and eddy current losses from said coil to said metal housing.

5. In an electronic tool detector, a metal housing having an opening therein, an oscillatory circuit including a sensing coil in said opening adapted to receive a tool in use, a magnetic shield of a material having a relative permeability greater than unity and which is electrically nonconductive interposed between said coil and said housing, and a liner of electrically inert material having good wear and abrasion resistant properties in said opening and said coil.

6. In an electronic tool detector, an oscillatory circuit including a sensing coil, a metal housing having an opening adapted to receive a tool in use and carrying said coil in said opening, a shield interposed between said coil and said housing of a material having a relative magnetic permeability greater than unity and which is a nonconductor of electricity, and a liner of ceramic material in said opening and said coil for protecting the coil and parts associated therewith from abrasive action of chips and the like carried into the hole by said tool.

7. In an electronic tool detector, an oscillatory circuit including a sensing coil, a metal housing having an opening adapted to receive a tool in use and carrying said coil in said opening which also is adapted to receive and surround a tool in said hole, a magnetic shield of a material having a relative permeability greater than unity and which is electrically nonconductive interposed between said coil and said housing, and a liner of ceramic material in said opening and said coil for protecting the coil and parts associated therewith from abrasive action of chips and the like carried into the hole by said tool, said liner extending axially beyond said shield, and said housing having radial lip portions overlapping the ends of said liner and extending flush with the inner side thereof.

8. In an electronic tool detector, an oscillatory circuit including a sensing coil surrounded and embraced by a layer of material selected from the group consisting of ferrite and insulated powdered iron.

9. In an electronic tool detector, an oscillatory circuit including a sensing coil adapted to receive and to surround a cutting tool in use, and a shell of a material selected from the group consisting of ferrite and insulated powdered iron surrounding said coil.

10. In an electronic tool detector, an oscillatory circuit including a sensing coil adapted to receive and surround a cutting tool in use, and a shell of a material selected from the group consisting of ferrite and insulated powdered iron, the main body of said shield surrounding said coil and lateral portions of the shield extending radially inwardly along the sides of and in embracing relation to said coil.

11. In an electronic tool detector, an oscillatory circuit including a sensing coil shielded outwardly and laterally thereof by a band of material selected from the group consisting of ferrite and insulating powdered iron.

12. In an electronic tool detector, an oscillatory circuit including a sensing coil, a liner of electrically inert wear and abrasion resistant material in said coil, and a shield of a material selected from the group consisting of ferrite and insulated powdered iron surrounding said coil and at least a portion of said liner.

13. In an electronic tool detector, an oscillatory circuit including a sensing coil, and a shield of a material selected from the group consisting of ferrite and insulated powdered iron surrounding said coil, said shield being essentially U-shaped in transverse section and being disposed on three sides of said coil.

14. In an electronic tool detector, an oscillatory circuit including a sensing coil, a tubular ceramic liner in said coil, a shield of a material selected from the group consisting of ferrite and insulated powdered iron surrounding said coil and at least a portion of said liner, said shield and said liner cooperating to completely enclose said coil, and a metal housing carrying said liner and said shield with the coil embedded therein.

15. In an electric tool detector, an oscillatory circuit including a sensing coil, a tubular ceramic liner in said coil, a shield of a material selected from the group consisting of ferrite and insulated powdered iron surrounding said coil and at least a portion of said liner, said shield and said liner cooperating to enclose said coil, and a metal housing carrying said liner and said shield with the coil embedded therein, said liner projecting laterally beyond said shield and portions of said housing overlapping the ends of said liner.

16. In an electronic tool detector, an oscillatory circuit including a sensing coil adapted to receive and to surround a cutting tool in use, a magnetic shell of a material having a relative permeability greater than unity and which is electrically nonconductive surrounding said coil, and a metal housing carrying said coil and said shell.

17. In an electronic tool detector, an oscillatory circuit including a sensing coil adapted to receive and to surround a cutting tool in use, a magnetic shell of a material having a relative permeability greater than unity and which is electrically nonconductive surrounding said coil, a liner of electrically inert wear and abrasion resistant material in and surrounded by said coil, and a metal housing carrying said coil and said liner separated from the coil by said shell.

18. In an electronic tool detector, an oscillatory circuit including a sensing coil adapted to receive and surround a cutting tool in use, a magnetic shell of a material having a relative permeability greater than unity and which is electrically nonconductive surrounding said coil, a liner of electrically inert wear and abrasion resistant material in and surrounded by said coil, and a metal housing carrying said coil and said liner separated from the coil by said shell, said liner extending axially beyond said shield and said housing overlapping the ends of said liner.

19. A coil mounting for electronic tool detectors comprising a sensing coil, a metal housing for said coil, a shield of a material selected from the group consisting of ferrite and insulated powdered iron interposed between the coil and said housing, and a liner of electrically inert, wear and abrasion resistant material.

20. A coil mounting for an electronic tool detector of the type having an oscillatory circuit comprising a sensing coil adapted to be connected in and to form a part of said oscillatory circuit, a shield of a material selected from the group consisting of ferrite and insulated powdered iron surrounding said coil, and a liner of electrically inert and abrasion resistant material in said coil.

References Cited in the file of this patent

UNITED STATES PATENTS

| | | |
|---|---|---|
| 2,807,720 | Charles | Sept. 24, 1957 |
| 2,870,577 | Seborg | Jan. 27, 1959 |

OTHER REFERENCES

Clar: German application 1,033,991, printed July 10, 1958. (K1 49a 55/01), 2 pages spec., 1 sheet drawing.

UNITED STATES PATENT OFFICE
CERTIFICATE OF CORRECTION

Patent No. 3,001,421                        September 26, 1961

Herbert A. Martens

It is hereby certified that error appears in the above numbered patent requiring correction and that the said Letters Patent should read as corrected below.

Column 4, line 70, for "powered" read -- powdered --; column 6, line 40, for "electric" read -- electronic --.

Signed and sealed this 29th day of May 1962.

(SEAL)
Attest:

ERNEST W. SWIDER                        DAVID L. LADD
Attesting Officer                          Commissioner of Patents